United States Patent
Pratt et al.

(10) Patent No.: US 9,292,136 B2
(45) Date of Patent: Mar. 22, 2016

(54) NOTIFICATION SYSTEM FOR PROVIDING AWARENESS OF AN INTERACTIVE SURFACE

(71) Applicant: AT&T Intellectual Property I, L.P., Atlanta, GA (US)

(72) Inventors: James H. Pratt, Round Rock, TX (US); Steven M. Belz, Cedar Park, TX (US); Marc A. Sullivan, Round Rock, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 192 days.

(21) Appl. No.: 13/633,579

(22) Filed: Oct. 2, 2012

(65) Prior Publication Data

US 2014/0091937 A1    Apr. 3, 2014

(51) Int. Cl.

| | | |
|---|---|---|
| G08B 21/00 | (2006.01) | |
| G05B 23/02 | (2006.01) | |
| G08B 23/00 | (2006.01) | |
| B60Q 1/00 | (2006.01) | |
| G06K 9/00 | (2006.01) | |
| G09G 5/00 | (2006.01) | |
| G06F 17/10 | (2006.01) | |
| G06G 7/78 | (2006.01) | |
| G08G 1/16 | (2006.01) | |
| G06F 3/042 | (2006.01) | |
| G08B 21/02 | (2006.01) | |
| G06F 3/0346 | (2013.01) | |
| G06F 3/0338 | (2013.01) | |
| G08G 1/04 | (2006.01) | |
| G02B 27/01 | (2006.01) | |
| G08B 7/06 | (2006.01) | |

(52) U.S. Cl.
CPC .............. *G06F 3/0425* (2013.01); *G08B 21/02* (2013.01); *G02B 2027/0138* (2013.01); *G06F 3/0338* (2013.01); *G06F 3/0346* (2013.01); *G06T 2207/10016* (2013.01); *G06T 2207/30241* (2013.01); *G06T 2210/21* (2013.01); *G08B 7/06* (2013.01); *G08G 1/04* (2013.01)

(58) Field of Classification Search
CPC .. G08G 1/005; F21W 2111/023; G06F 3/011; G06K 9/00805
USPC .................................................. 340/3.41, 670
See application file for complete search history.

(56) References Cited

U.S. PATENT DOCUMENTS

| | | | |
|---|---|---|---|
| 6,384,742 B1 * | 5/2002 | Harrison | 340/944 |
| 6,828,918 B2 * | 12/2004 | Bowman et al. | 340/4.1 |
| 6,976,220 B1 | 12/2005 | Lapstun et al. | |

(Continued)

*Primary Examiner* — Mohamed Barakat
(74) *Attorney, Agent, or Firm* — Akerman LLP; Michael K. Dixon; Mammen (Roy) P. Zachariah, Jr.

(57) ABSTRACT

A system for providing awareness of an interactive surface is disclosed. The system may include a processor that is communicatively linked to an interactive surface. The processor may determine a position and a velocity of an object that is within range of the interactive surface based on one or more of media content, vibrations, air movement, sounds and, global positioning data associated with the object. Additionally, the processor may determine if the object has a trajectory that would cause the object to collide with the interactive surface based on the information associated with the object. If the processor determines that the object has a trajectory that would cause the object to collide with the interactive surface, the processor can generate a notification.

20 Claims, 10 Drawing Sheets

(56) References Cited

U.S. PATENT DOCUMENTS

| | | | |
|---|---|---|---|
| 6,980,125 B1* | 12/2005 | Barber | 340/917 |
| 7,046,128 B2 | 5/2006 | Roberts | |
| 7,327,253 B2 | 2/2008 | Whitten et al. | |
| 7,679,498 B2 | 3/2010 | Pawlicki et al. | |
| 7,978,184 B2 | 7/2011 | Morrison | |
| 8,072,438 B2 | 12/2011 | Pearce et al. | |
| 8,090,147 B2* | 1/2012 | Sano | G06K 9/00805 382/103 |
| 8,115,734 B2 | 2/2012 | Pearce et al. | |
| 8,456,293 B1* | 6/2013 | Trundle | G08B 21/0423 340/517 |
| 8,590,087 B2* | 11/2013 | Swessel et al. | 14/71.3 |
| 2003/0142073 A1* | 7/2003 | Fukushima | G06F 3/046 345/158 |
| 2005/0275525 A1* | 12/2005 | Ahmed | F24F 11/0086 340/524 |
| 2006/0257004 A1* | 11/2006 | Chen | G01S 3/7864 382/103 |
| 2007/0106474 A1* | 5/2007 | Ide | B60R 21/013 701/301 |
| 2008/0022596 A1* | 1/2008 | Boerger et al. | 49/31 |
| 2009/0002197 A1* | 1/2009 | Cemper | 340/989 |
| 2009/0187300 A1* | 7/2009 | Everitt et al. | 701/29 |
| 2009/0245570 A1* | 10/2009 | Juza | G06K 9/3233 382/103 |
| 2010/0323762 A1* | 12/2010 | Sindhu | 455/566 |
| 2011/0199304 A1* | 8/2011 | Walley | G06F 3/017 345/158 |
| 2011/0311103 A1* | 12/2011 | Hammarstrom et al. | 382/104 |

* cited by examiner

NOTIFICATION SYSTEM FOR PROVIDING AWARENESS OF AN INTERACTIVE SURFACE

FIELD OF THE INVENTION

The present application relates to collision warning systems, and more particularly to a system and method for preventing a collision with an interactive surface.

BACKGROUND

In today's technologically-driven society, interactive glass surfaces and displays are at the forefront of innovation and, while not yet ubiquitous, will become increasingly popular with users in the coming years. This is particularly true considering the very rapid commercial acceptance of products that utilize touchscreen technologies such as touchscreen phones, tablets, computers, televisions, and displays. As a result, users will have many more opportunities to interact with such interactive glass surfaces or other similar surfaces. For example, network-connected computers can display computer interfaces on a glass table for users sitting at the table during a meeting; glass walls can have interfaces that users can interact with to perform a variety of functions; sliding glass doors in homes can have computer displays that users can interact with, and patient bedrooms in hospitals can have glass walls that doctors can use to view medical information.

As interactive glass surfaces become more widespread, the chances of users or objects colliding with such glass surfaces will increase substantially. Unfortunately, glass surfaces can be quite dangerous to those who do not see them. A user that collides with an interactive glass surface can incur significant injuries or even cause the glass to shatter or malfunction. For example, if an interactive glass surface is used in a hospital, two doctors discussing and walking at the same time may collide with a clear interactive glass display. Also, kids running around a household may accidentally run into interactive glass doors or other displays and sustain serious injuries. Additionally, users may accidentally place inappropriate materials on a computer display that may ultimately damage the display. Furthermore, when a person is walking in the dark in the middle of the night to get a glass of water, the person may walk right into an interactive glass display. Although the future of interactive displays is exciting, there are many unique nuances associated with the use of interactive displays.

SUMMARY

A system and accompanying methods for providing awareness of an interactive surface are disclosed. The system may be configured to generate various types of notifications or perform other actions if a person or an object has a trajectory that indicates that the person or object will collide with an interactive surface. For example, various types of notifications may include, but are not limited to, one or more of adjusting the opacity of the interactive surface, presenting different types of messages on the glass surface, emitting sounds and vibrations, and displaying various types of images or colors on the glass surface. Notably, the trajectory of the person or object may be determined based on determining position and velocity by using one or more cameras, sensors, location positioning systems, and other systems and devices that can capture and process information about the person or the object. If the person or object continues on a trajectory to collide with the interactive surface, the notifications may increase in intensity. On the other hand, if the person or object changes its trajectory such that the person or object is no longer on a path to collide with the interactive surface, the system may cause the notifications to decrease in intensity or remove the notifications altogether.

The system for preventing a collision with an interactive surface may include a memory for storing instructions and a processor that is communicatively coupled to the interactive surface. The processor may execute the instructions to perform operations comprising receiving media content associated with an object that is within a range of the interactive surface. Additionally, the processor may be configured to detect a position and a velocity of the object that is in the range of the interactive surface. The processor may detect the position and the velocity based at least in part on the recorded media content. Also, the processor may determine if the object has a trajectory that would cause the object to collide with the interactive surface. The trajectory may be determined based on the position and the velocity of the object. Furthermore, the processor may generate a notification if the object is determined to have a trajectory that would cause the object to collide with the interactive surface.

In another embodiment, a method for providing awareness of an interactive surface is provided. The method may include receiving media content associated with an object that is within a range of the interactive surface. Additionally, the method may include determining a position and a velocity of the object that is in the range of the interactive surface based at least in part on the media content. A processor may be configured to determine the position and the velocity of the object by executing instructions stored in a memory. The method may also include determining if the object has a trajectory that would cause the object to collide with the interactive surface. The trajectory of the object may be determined based on the position and the velocity of the object. Furthermore, the method may include generating a notification if the object is determined to have the trajectory that would cause the object to collide with the interactive surface.

According to another exemplary embodiment, a tangible computer-readable medium comprising instructions for providing awareness of an interactive surface may be provided. The computer instructions, when loaded and executed by a processor, may cause the processor to perform operations including the following: receiving media content associated with an object that is within a range of an interactive surface; determining a position and a velocity of the object that is in the range of the interactive surface based at least in part on the media content; determining if the object has a trajectory that would cause the object to collide with the interactive surface, wherein the trajectory is determined based on the position and the velocity of the object; and generating a notification if the object is determined to have the trajectory that would cause the object to collide with the interactive surface.

These and other features of the system and methods are described in the following detailed description, drawings, and appended claims.

DETAILED DESCRIPTION OF THE INVENTION

A system 100 for providing awareness of an interactive surface 110 is disclosed in the present disclosure. The system 100 alerts a person to the presence of an interactive surface 110 to prevent a collision with the interactive surface 110. The system 100 for providing awareness of an interactive surface 110 may be configured to generate various types of notifications or perform other actions if a user or an object 105 has a trajectory that indicates that the user or object will collide with an interactive surface 110 or other surface. For example, various types of notifications may include, but are not limited to including, one or more of adjusting the opacity of the interactive surface 110, presenting different types of messages on or near the interactive surface 110, emitting sounds and vibrations from or around the interactive surface 110, or displaying various types of images or colors on or near the interactive surface 110.

The system 100 may determine the trajectory of the person or object 105 based on determining the person or object's position and velocity by using one or more image capture devices 120, sensors, location positioning systems, and other systems and devices that can retrieve or process information, or both, relating to the person or the object 105. If the person or object 105 continues on the trajectory to collide with the interactive surface 110, the system 100 may increase the intensity of the notifications or actions. However, if the person or object 105 adjusts its trajectory so that the person or object is no longer on a path to collide with the interactive surface 110, the system 100 may decrease the intensity of the notifications or even remove the notifications altogether. Also, the system 100 may utilize sensors to determine one or more of air movement, sounds, vibrations or other detectable information associated with the person or the object 105, and may generate notifications based on such information.

Although FIGS. 1-6 illustrate specific example configurations of the various components of the system 100, the system 100 may include any configuration of the components, which may include using a greater or lesser number of the components. For example, the system 100 may include multiple servers 150, multiple location determination devices 115, and multiple image capture devices 120. As another example, the system 100 may be configured to not include the air movement sensor 125, but may include the sound sensor 130 and the vibration sensor 135.

Object 105 in FIGS. 1A-2C is shown as being a person that is approaching the interactive surface 110. However, the object 105 is not limited to being a person, but may also be any animal or thing that could potentially collide with the interactive surface 110. Additionally, the object 105 may be anything that may be sensed by the various components of the system 100.

The interactive surface 110 may be any device that a user or potentially an animal could interact with and may be configured to display a wide range of notifications to users. As shown in FIGS. 1A-2C, the interactive surface 110 may be an interactive glass display, a computer, a mobile device, a tablet device, a wall display, an interactive table display, any interactive monitor or television display, any touchscreen device having a display, a plasma display, a liquid crystal display, a 3-dimensional (3-D), or any other device that has a display. In one embodiment, the interactive surface 110 may be an electrochromic device, a suspended particle device, a polymer dispersed liquid crystal device, mechanical smart windows, or a device having the capability of changing its opacity, color, visual appearance, or temperature, or a combination thereof.

The interactive surface 110 may include or otherwise be communicatively linked to one or more electronic processors 112 that may be configured to perform a variety of operations in the system 100. The electronic processors 112 may perform the operations in the system 100 or may direct various components in communication with the interactive surface 110 or other components of the system 100 to perform the operations, or both. For example, the electronic processors 112 may direct the electronic processors 116 of the location determination device 115 to determine position and velocity information for the object 105. As another example, the electronic processors 112 may direct the image capture device 120 to capture media content associated with the object 105. Notably, the interactive surface 110 may be configured to display colors, adjust its opacity, display images and messages, display user-interactive programs, emit sounds of various pitches, volumes, and timbres, emit vibrations, adjust its temperature, receive input from users, display outputs, or perform any computer operations by utilizing the electronic processor 112 or other means. Additionally, the interactive surface 110 may be communicatively linked to one or more of the location determination device 115, the image capture device 120, the air movement sensor 125, the sound sensor 130, the vibration sensor 135, the ultrasound device 137, the mobile device 140, the communications network 145, the server 150, and the database 155.

The location determination device 115 may be any device that may be utilized to determine a position or a velocity, or both, of the object 105, which, in FIGS. 1-6, is a person. The location determination device 115 may include or otherwise be communicatively linked to one or more electronic processors 116 that may be configured to perform a variety of operations. The electronic processors 116 may perform the operations in the system 100 or may direct various components in communication with location determination device 116 or other components of the system 100 to perform the operations, or both. The electronic processors 116 may be software, hardware, or a combination of hardware and software. The location determination device 115 may include a global positioning system, a device that determines location by triangulation, or any device that can determine the position or velocity of the object 105, or both. Notably, the location determination device 115 may be configured to determine a current position or a current velocity of the object 105, or both, with respect to the position of the interactive surface 110. Furthermore, the location determination device 115 may be communicatively linked with any of the components in the system 100 and can transmit data, such as the position or velocity data, or both together, with any other necessary information, to any of the components in the system 100. Although the location determination device 115 is illustratively shown on the interactive surface 110, the location determination device 115 may be placed anywhere that the location determination device 115 can effectively capture information associated with the object 105. In one embodiment, the location determination device 115 may be located in close proximity to or even within the interactive surface 110 itself.

The image capture device 120 of the system 100 may be a camera, such as, but not limited to, a video camera or other type of surveillance device that may be utilized to capture and record media content associated with the object 105. The media content can include visual content, audio content, content associated with vibrations that the object 105 makes, and other content. For example, if the object 105 is a person, as shown in FIGS. 1A-2C, the image capture device 120 can record video of the person and any sounds that the person makes when the person is in range of the interactive surface 110 or the system 100. The image capture device 120 may record sounds by utilizing a microphone, which may reside within the interactive surface 110 or in proximity to the interactive surface 110.

In one embodiment, the image capture device 120 may be configured to determine the position, size, and the velocity of the object 150 based on the media content that the image capture device 120 records. In another embodiment, the image capture device 120 may be able to generate a 3-D image that can be utilized to show where and how fast the object 105 is moving with respect to the interactive surface 110. Furthermore, the image capture device 120 may be communicatively linked with any of the components in the system 100. Although the image capture device 120 is illustratively shown above the interactive surface 110, the image capture device 120 may be placed anywhere that the image capture device 120 can effectively capture media content associated with the object 105. In an embodiment, the image capture device 120 may be a component of the interactive surface 110 itself, and may be positioned within the interactive surface 110 or outside of the interactive surface 110.

The air movement sensor 125 of the system 100 may be configured to detect changes in air movement, which may be generated by the object 105, that are in the general vicinity of the interactive surface 110. For example, if a person is running towards the interactive surface 110, the air movement sensor 125 can detect changes in air movement caused by the person's running. Additionally, the sound sensor 130 may be configured to detect changes in sound in the general area of the interactive surface 110 that may be caused by the object 105. For example, if a person is making sounds near the interactive surface 110, the sound sensor 103 can detect the sounds that the person makes. Furthermore, the vibration sensor 135 may be configured to detect changes in vibrations in the general area of the interactive surface 110 that may be caused by the object 105. For example, the vibrations that a person makes while walking or running towards the interactive surface 110 may be detected by the vibration sensor 135 and may be used by the system 100 to determine where the person is and how fast the person is moving.

One or more of the air movement sensor 125, the sound sensor 130, and the vibration sensor 135 may be configured to transmit detected information to any of the components of the system 100 and may be configured to include electronic processors. Also, the information detected by the air movement sensor 125, the sound sensor 130, and the vibration sensor 135 may be utilized in determining the position and velocity of the object 105. Although the air movement sensor 125, the sound sensor 130, and the vibration sensor 135 are illustratively shown on the interactive surface 110, the sensors may be placed anywhere that the sensors can effectively detect the information about the object 105.

In one embodiment, the system 100 may also include an ultrasound device 137, which can be configured to emit an ultrasonic sound in the direction of the object 105. Once the ultrasonic sound is emitted, an echo may be returned from the object 105 based on the ultrasonic sound. The echo may be utilized by the system 100 to determine various information about the object 105 such as, but not limited to, the size, shape, position, and velocity of the object 105. Additionally, the echo may be utilized by the system 100 to generate an image, such as a 3-D image of the object 105 so that the interactive surface 110 can determine what is approaching it and display any necessary warning notifications.

The mobile device 140 may be cellular telephone, a tablet, a personal computer, or any other similar device that may be utilized by a person that is approaching the interactive surface 110. Notably, the mobile device 140 may be communicatively linked with any of the components in the system 100 and may transmit position or velocity data, or both, associated with the object 105 to the interactive surface 110 or other components in the system 100. For example, if the mobile device 140 is a cellular phone with a global positioning system (GPS), then position information, identification information, velocity information, or other types of information associated with the mobile device 140 or the person 105, or both, may be transmitted to the system 100 by the GPS. Additionally, the mobile device 140 may utilize triangulation or other location determination mechanisms to determine the position and velocity of the objection 105. The information transmitted to the system 100 may be utilized in determining a trajectory of the object 105 with respect to the interactive surface 110.

The communications network 145 may be any other suitable network that may be utilized to allow the various components of the system 100 to communicate with one another. For instance, the communications network 145 may be a wireless network, an ethernet network, a satellite network, a broadband network, a cellular network, a private network, a cable network, the Internet, or any other network. The server 150 may include an electronic processor and may be configured to handle any necessary processing for carrying out the various operative functions of the system 100. For example, the server 150 may receive data from the interactive surface 110, the location determination device 115, the image capture device 120, the air movement sensor 125, the sound sensor 130, the vibration sensor 135, the mobile device 140, the communications network 145, the ultrasound device 137, and the database 155 to determine the precise location of the object 105. In one embodiment, any of the electronic processors disclosed herein may perform the operations in the system 100 or may direct various components in communication with the components of the system 100 to perform the operations, or both. Additionally, the server 150 may be configured to transmit signals to the interactive surface 110 so that the interactive surface 110 can display notifications. As an example, if the system 100 determines that a person is about to collide with the interactive surface 110, the server 150 may send a signal to the interactive surface to display a message on the interactive surface 110 that can warn the person of the impending collision. Furthermore, any and all data that traverses the system 100 may be stored in the database 155.

Figure 1A:
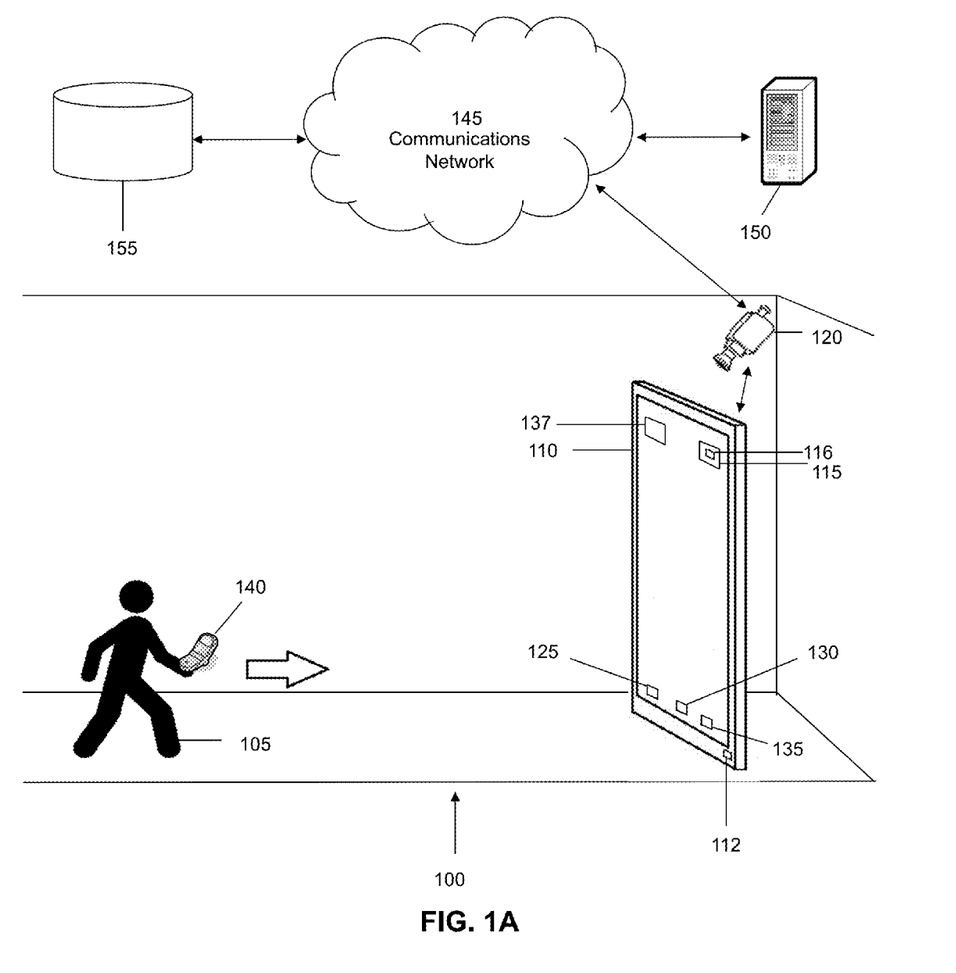
FIG. 1A is a schematic diagram illustrating a person that is approaching an interactive surface of an awareness system according to the present disclosure.
Figure 1B:
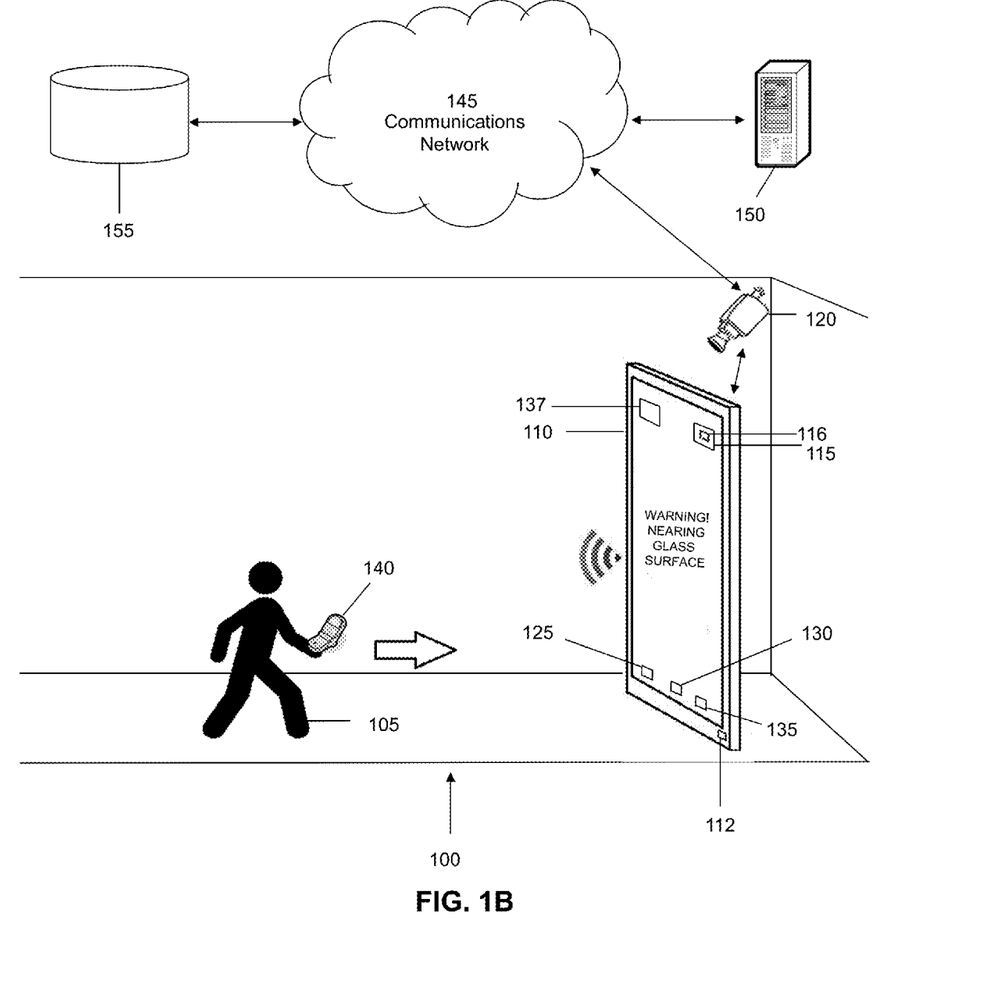
FIG. 1B is a schematic diagram illustrating a person that is in a position and is moving at a velocity that has triggered various notifications from the interactive surface of FIG. 1.
Figure 1C:
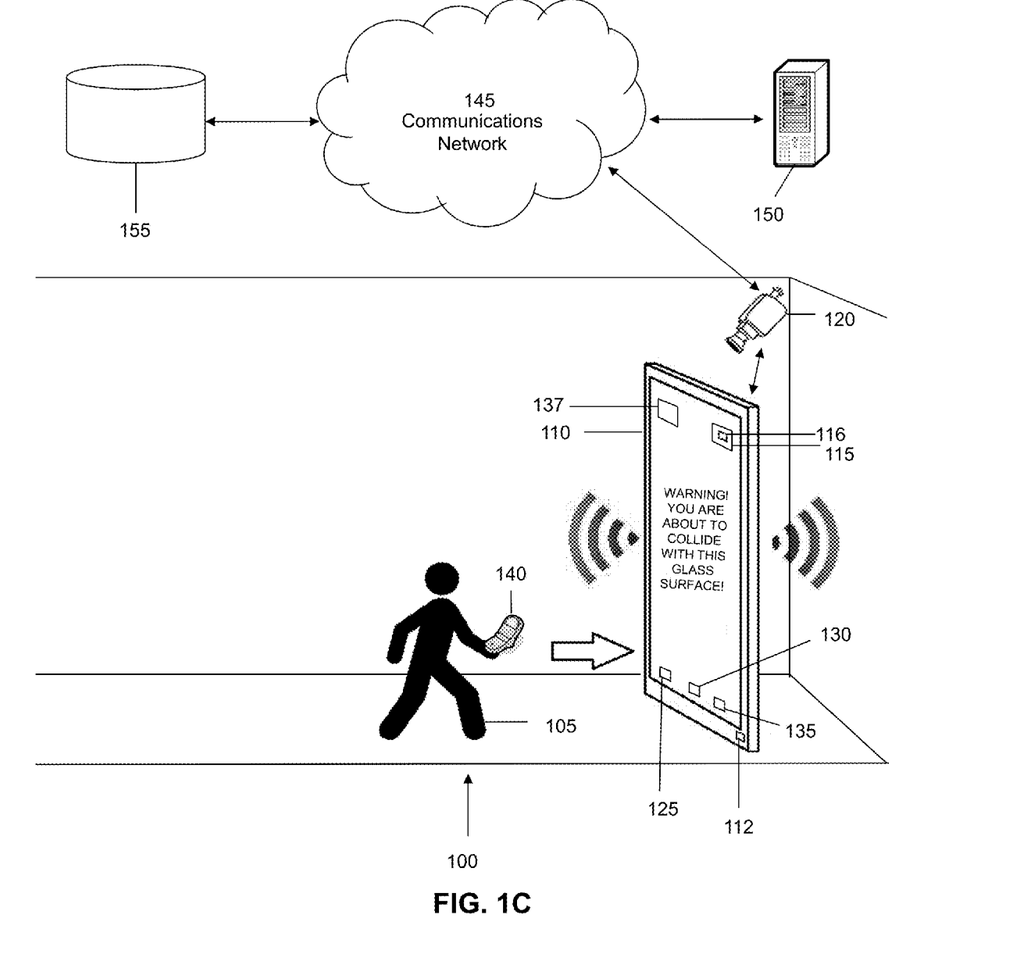
FIG. 1C is a schematic diagram illustrating a person that is in a position and is moving at a velocity that has triggered more intense notifications from the interactive surface of FIG. 1.

Operatively, the system 100 may be configured to provide awareness of the interactive surface 110 in a variety of ways. In a first example scenario, which is illustrated in FIGS. 1A-1C, an object 105 (in this case a person) is approaching the interactive surface 110. In this example, the interactive surface 110 is a large interactive glass display. In FIG. 1A, for example, the person is illustratively shown at a location far away from the interactive surface 110. One or more of the location determination device 115, the image capture device 120, the various sensors 125, 130, and 135, the ultrasound device 137, the mobile device 140, the communications network 145, the server 150, and the database 155, can all work in concert with one another to determine the person's position and velocity with respect to the interactive surface 110. Notably, not all of these devices are required to determine the position and velocity of the person, but rather any subset of the devices in the system 100 may be utilized to determine the person's position and velocity.

Once the position and velocity of the person are determined, the system 100, via server 150 or any other device in the system 100, can determine a trajectory of the person with respect to the interactive surface 110. If the trajectory indicates that a collision will occur, the system 100 may send a signal to the interactive surface 110 to display or emit a notification that can be perceived by the person. The notifications may include, but are not limited to including, a displayed image or message, a change in color of the interactive surface 110, emitted sounds and vibrations, or a change in the opacity of the interactive surface 110. In FIG. 1A, the person is far enough away from the interactive surface 110 that the system 100 does not cause the interactive surface 110 to generate a notification and the interactive surface 110 can remain in a transparent state.

In FIG. 1B, however, the person is shown at a location that is closer to the interactive surface 110 than the person is in FIG. 1A. The various devices in the system 100 may determine that the person is located at a position and is moving at a velocity such that the person may eventually collide with the interface surface 110. If the person is determined to be moving on a trajectory to eventually collide with the interface surface 110 based on his or her position or velocity, then system 100 may generate a notification and transmit the notification to the interface surface 110. In one embodiment, the notification may be a message such as "Warning! Nearing Glass Surface!," or another message that can notify the person of the presence of the interface surface 110. Additionally, the system 100 can cause the interface surface 110 to emit sounds and vibrations to notify the person of the presence of the interface surface 110 as well. At this point, the person may either change his or her trajectory based on the notifications displayed or emitted by the interface surface 110, or may continue to proceed on the trajectory towards the interface surface 110. If the system determines that the person stops moving, or moves in an alternate trajectory that would not cause the person to collide with the interface surface 110, the system 100 may remove any displayed notifications or cause any emitted warning sounds and vibrations to stop.

However, if the person continues to move on the trajectory to collide with the interface surface 110 as illustrated in FIG. 1C, then system 100 may transmit a signal to the interface surface 110 to display a more intense message such as "Warning! You Are About To Collide With This Glass Surface!," or another message that can urgently notify the person of the presence of the interface surface 110. Additionally, as shown in FIG. 1C, the system 100 can cause the interface surface 110 to emit sounds and vibrations of increased intensity to notify the person of the presence of the interface surface 110. Hopefully, after sensing or seeing the notifications of increased intensity, the person will change their trajectory to avoid a collision with the interface surface 110. If, however, the person was merely rushing to use the interface surface 110, and the person eventually slows down to a point where the system 100 no longer considers the person to be on a trajectory to collide with the interface surface 110, the interface surface 110 can either reduce the intensity of the notifications or remove the notifications altogether. In one embodiment, the interface surface 110 can display a program that the person may want to use or display instructions to teach the user how to use the interface surface 110.

Figure 2A:
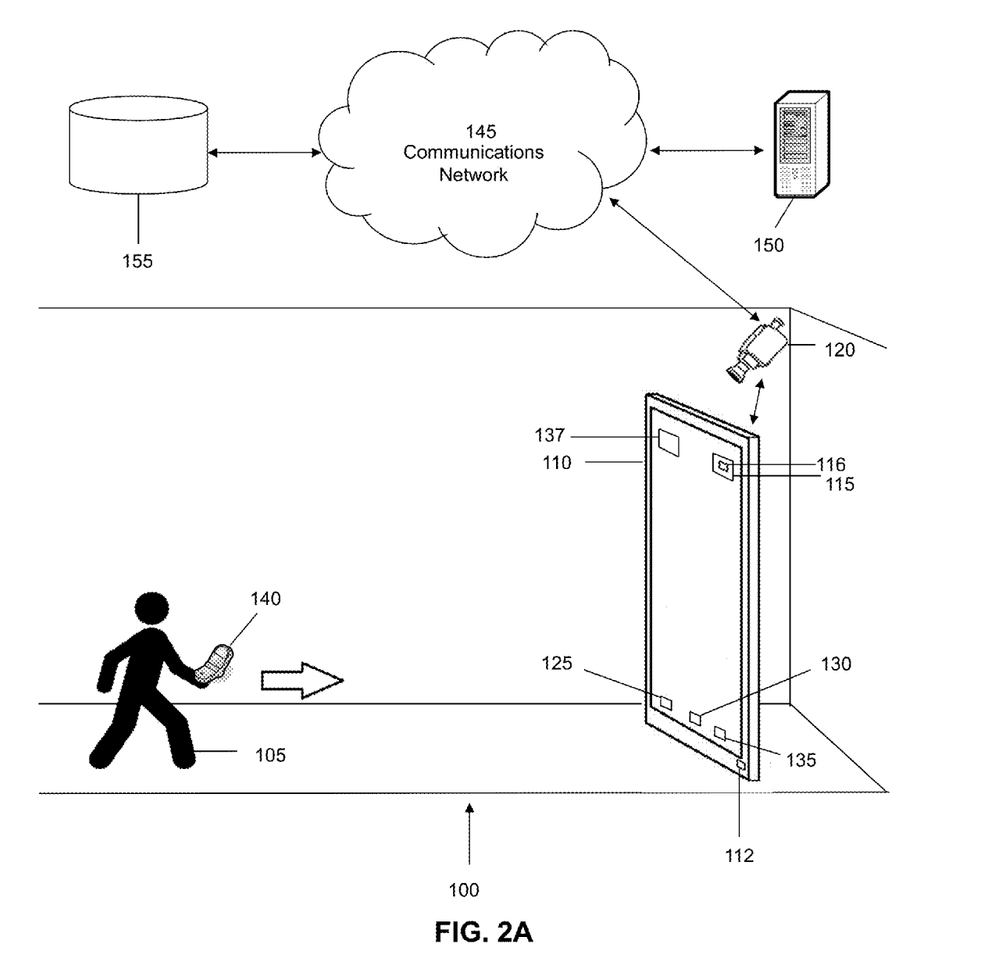
FIG. 2A is a schematic diagram illustrating a person that is approaching an interactive surface of another embodiment of the awareness system.
Figure 2B:
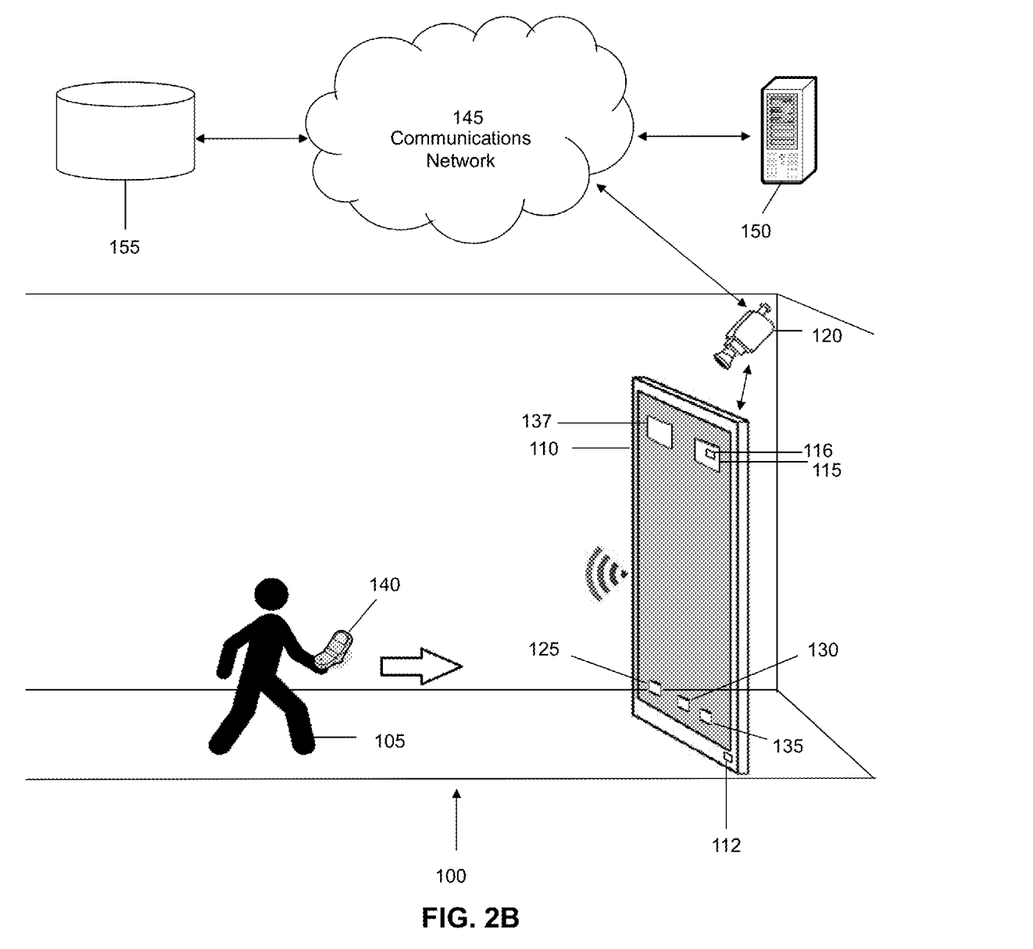
FIG. 2B is a schematic diagram illustrating a person that is in a position and is moving at a velocity that has triggered a notification from the interactive surface of FIG. 4.
Figure 2C:
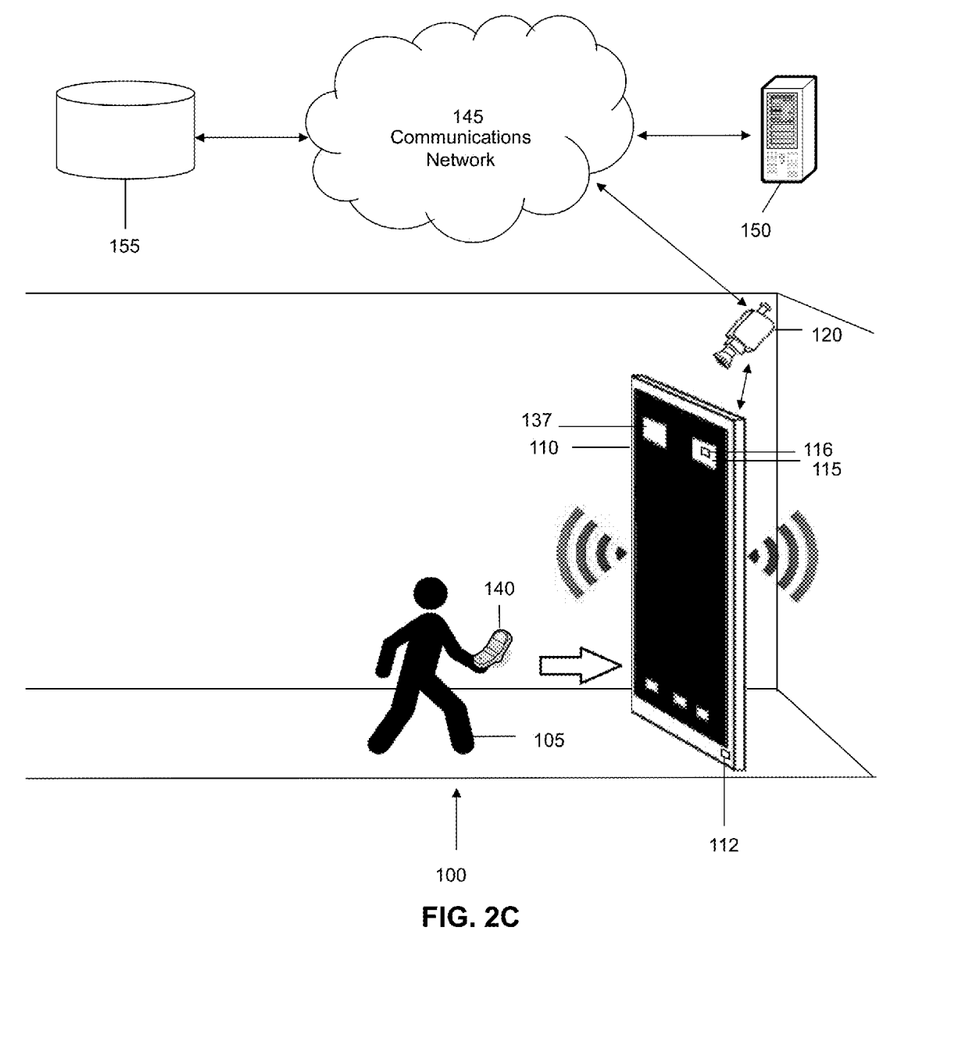
FIG. 2C is a schematic diagram illustrating a person that is in a position and is moving at a velocity that has triggered more intense notifications from the interactive surface of FIG. 4.

In another example scenario, which is illustrated in FIGS. 2A-2C, an object 105, which is shown as being a person, is approaching the interactive surface 110, which in this case is a large interactive glass display. In FIG. 2A, the person is shown at a location far from the interactive surface 110. As in the previous example, the various components of the system 100 can all work in concert together to determine the person's position and velocity with respect to the interactive surface 110. However, as mentioned above, not all of the devices in the system 100 are required to determine the position and velocity of the person, but rather any subset of the devices in the system 100 may be utilized to determine the person's position and velocity. Once the position and velocity of the person are determined, the system 100, via server 150 or any other device in the system 100, can determine the trajectory of the person with respect to the interactive surface 110. If the trajectory indicates that a collision will occur, the system 100 may send a signal to the interactive surface 110 to display or emit a notification that can be perceived by the person. In FIG. 2A, the person has been determined to be far enough away from the interactive surface 110 that the system 100 does not cause the interactive surface 110 to generate a notification. As a result, the interactive surface 110 remains in a transparent state.

In FIG. 2B, however, the person is shown at a location that is closer to the interactive surface 110 than the person is in FIG. 2A and closer than a threshold distance. When the person proceeds closer than the threshold distance, the system 100 may determine that the person has a position and velocity such that the person may collide with the interface surface 110. If the person is determined to be moving on a trajectory to eventually collide with the interface surface 110 based on his or her position or velocity, then system 100 may transmit a signal to the interface surface 110 to adjust its opacity or color so that the system 100 that can alert the person of the presence of the interface surface 110. As shown in FIG. 2B, the interface surface 110 is more opaque than the interface surface 110 illustrated in FIG. 2A. Alternatively or additionally, the system 100 can cause the interface surface 110 to emit sounds or vibrations, or both, to notify the person of the location of the interface surface 110. Upon sensing the notifications from the system 100, the person may either change his or her trajectory or may continue to proceed on the trajectory towards the interface surface 110. If the system determines that the person is no longer on a trajectory to collide with the interface surface 110, the system 100 may cause the interface surface 110 to remove or reduce any notifications. However, if the person continues to move on the trajectory to collide with the interface surface 110 as illustrated in FIG. 2C, then the system 100 may transmit a signal to the interface surface 110 to increase the opacity of the interface surface 110 to further notify the person of the presence of the interface surface 110.

In one embodiment, the interface surface 110 may be given a signal by the system 100 to display a darker or brighter color on the interactive surface 110. For instance, as shown in FIG. 2C, the interface surface 110 is more opaque than the interface surface 110 illustrated in FIG. 2B. Additionally, the system 100 can cause the interface surface 110 to emit sounds or vibrations, or both, of increased intensity to notify the person of the interface surface 110. Hopefully, after noticing the notifications of increased intensity, the person will change their trajectory to avoid colliding with the interface surface 110. However, if the person was merely rushing to use the interface surface 110, and the person eventually slows down to a point where the system 100 determines that the person is not on a trajectory to collide with the interface surface 110, the interface surface 110 can either reduce the intensity of the notifications or remove the notifications. In one embodiment, the interface surface 110 can display a program that the person may want to use or even display instructions that can teach the user how to use the interface surface 110.

Figure 3:
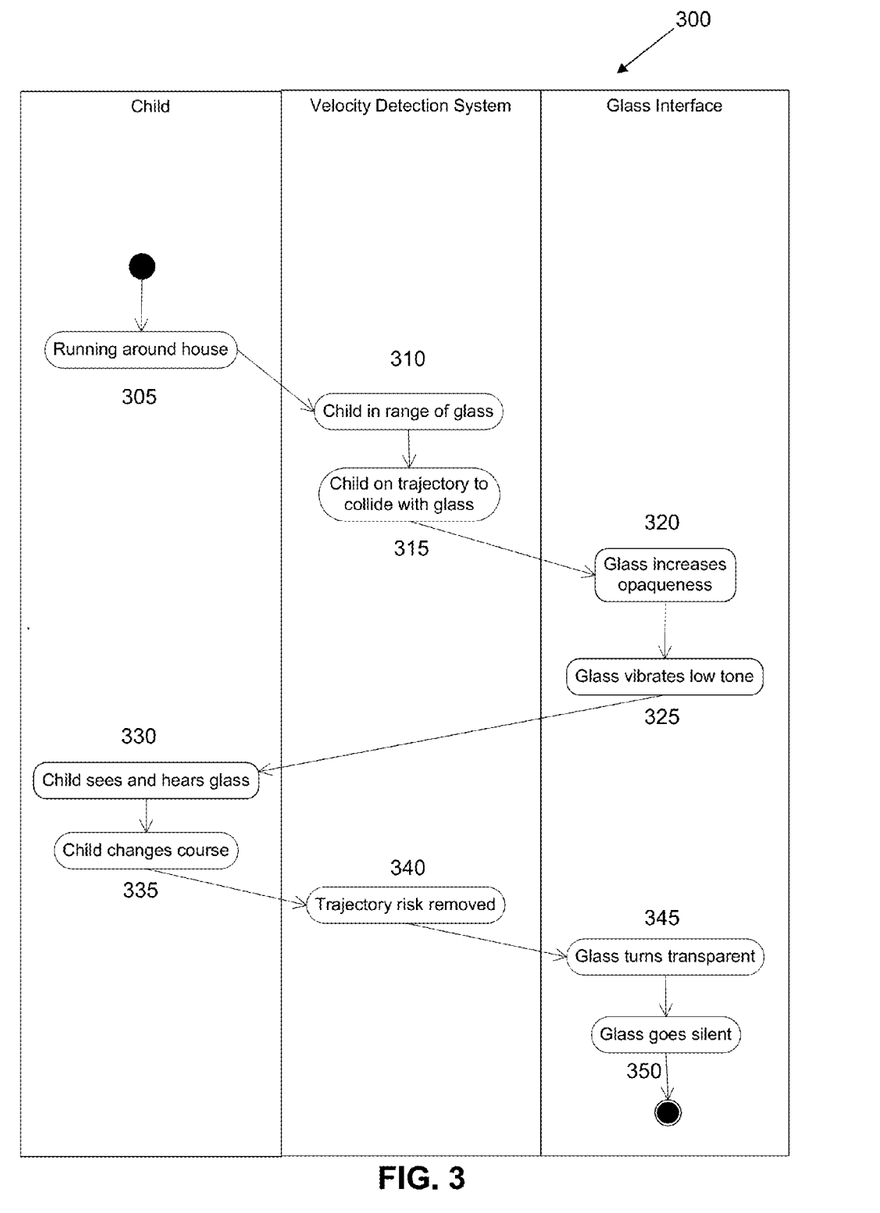
FIG. 3 is a flow diagram that illustrates a sample method for receiving various types of notifications based on the person's trajectory with respect to an interactive surface according to the present disclosure.

An exemplary method 300 for providing awareness of an interactive surface 110 as shown in FIG. 3 involves a situation where a child is running around a family home. The method 300 may include, at step 305, having a child running around his family's house. While the child is running around the house, the system 100 may determine, at step 310, whether the child is in the range of the interactive surface 110, which in this case may be an interactive glass display. At step 315, the system 100 may determine that the child is on a trajectory to collide with the interactive surface 110. Once the system 100 determines that the child is on the trajectory to collide with the interactive surface 110, the system 100 can transmit a signal to the interactive surface 110 to cause the interactive surface 110 to increase its opacity. Alternatively or additionally to sending a signal to increase opacity, the system 100 can send a signal to the interactive surface 110 to generate and vibrate a low-pitch tone at step 325. At step 330 of the method 300, the child can see or hear, or both, the interactive surface 110 based on the increased opacity and the low-pitch tone. Once the child sees or hears, or both, the interactive surface 110, the child can change his trajectory so that he will no longer be on course to collide with the interactive surface 110 at step 335. At step 340, the system 100 can determine that the child is on a new trajectory that would not cause a collision with the interactive surface 110. At step 345, the system 100 can send signals to the interactive surface 110 become transparent once again and to stop vibrating the tone.

Figure 4:
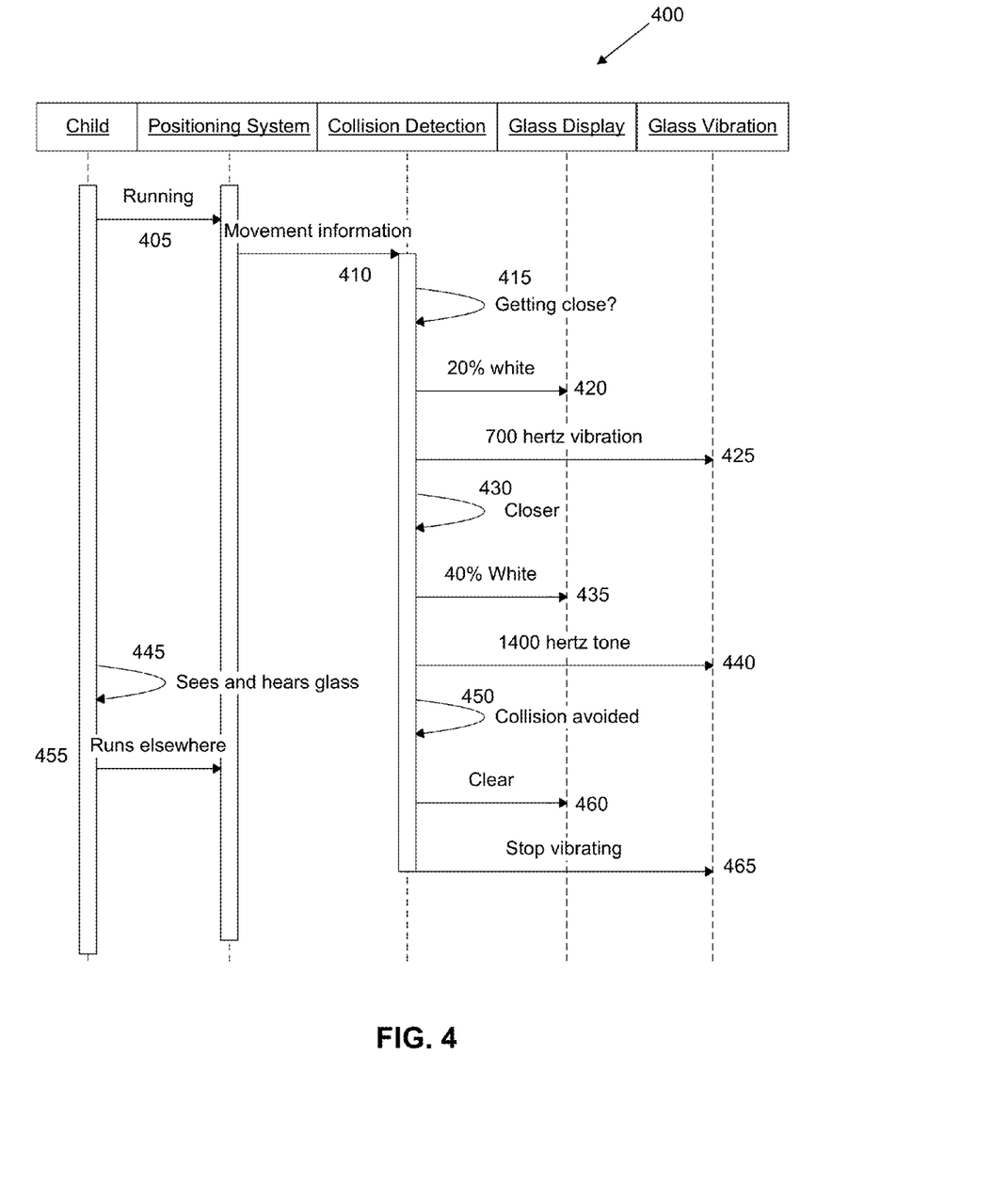
FIG. 4 is a flow diagram illustrating another sample method for receiving various types of notifications based on a person's trajectory with respect to an interactive surface.

Another exemplary method 400 for providing awareness of an interactive surface 110 (in this case a glass display), as shown in FIG. 4, involves a situation where a child does not take the first warning from the interactive surface 110. The method 400 may include, at step 405, having the child running around his family's house as in the previous example. While the child is running around the house, the system 100 may determine, at step 410, the child's movement information, such as his position, velocity, and trajectory. At step 415, the system 100 may determine that the child is getting too close to the interactive surface 110. As a result, the method 400 may include having the system 100 send a signal to the interactive surface 110 to increase its opacity such that the interactive surface 110 is 20% white at step 420. At step 425, the system 100 can cause the interface surface 110 to emit a 700 hertz (Hz) vibration.

At step 430, the system 100 can determine that, despite the initial notifications, the child is getting even closer to the interactive surface 110. Now, the system 100 can send another signal to the interactive surface 110 to increase its opacity such that the interactive surface 110 is now 40% white at step 435. Additionally, at step 440, the system 100 can cause the interface surface 110 to adjust the 700 Hz vibration to a 1400 Hz vibration. At this point, the child may see or hear, or both, the interactive surface 110 at step 445. At step 450, the system 100 can determine that a collision with the interactive surface 110 has been avoided because the child has changed his trajectory. At step 455, the child can run elsewhere and the system 100 can determine the child's new position, velocity, and trajectory and find that the child is no longer at risk of a collision. At step 460, the system 100 can transmit a signal to the interactive surface 110 to return to a clear or transparent state. Finally, the system 100 can transmit a signal to the interactive surface 110 to stop emitting vibrations at step 465.

Figure 5:
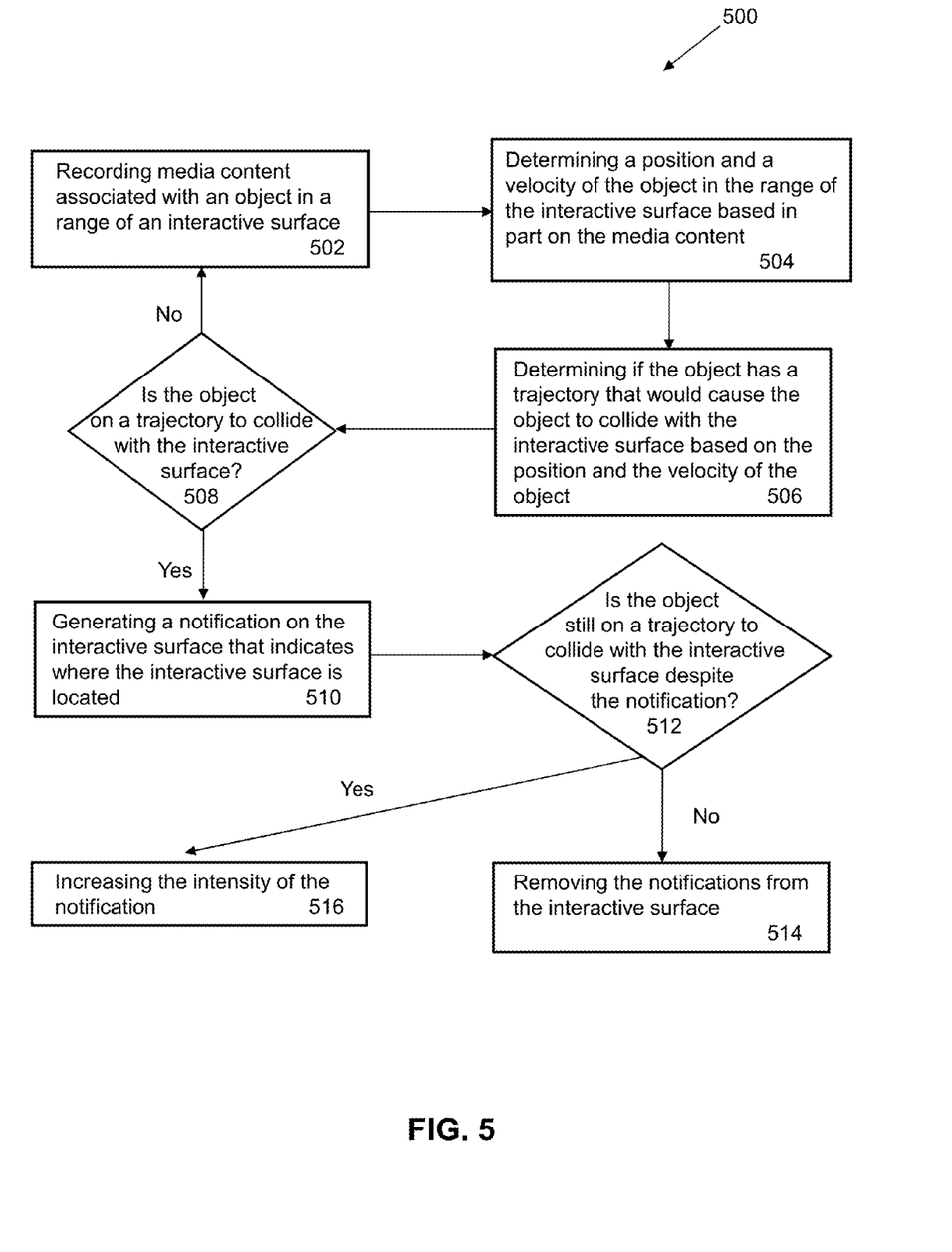
FIG. 5 is a flow diagram illustrating another method for providing awareness of an interactive surface according to an embodiment of the present disclosure.

In yet another an exemplary method 500 for providing awareness of an interactive surface 110, as shown in FIG. 5, the method 500 may include, at step 502, recording media content associated with an object 105 that is in the range of an interactive surface 110. The media content can be sound content, visual content, or vibrations, any combination thereof, or any other content. The media content may be recorded, for example, by the image capture device 120 or other appropriate device. At step 504, the method 500 may include determining a position and a velocity of the object 105 based on the media content or on any of the information gathered by any of the components in the system 100, or any combination thereof. The position and the velocity, for example, may be determined by the location determination device 115, the interactive surface 110, the server 150, the computer system 600, any combination thereof, or other appropriate device. The method 500 may include, at step 506, determining if the object 105 has a trajectory that would cause the object to collide with the interactive surface 110 based on the position and velocity of the objection 105. The trajectory may also be determined based on sensed vibrations, sounds, images, or other information gathered by the components of the system 100. In one embodiment, the trajectory may be determined by the location determination device 115, the interactive surface 110, the server 150, the computer system 600, any combination thereof, or other appropriate device.

At step 508, if the object 105 is determined not to be on a trajectory to collide with the interactive surface 110, then the method can return to step 502 or the method can conclude. However, if the object 105 is determined to be on a trajectory to collide with the interactive surface 110, the method 500 may include generating a notification on or near the interactive surface 110 to indicate the location of the interactive service 110 at step 510 via the location determination device 115, the interactive surface 110, the server 150, the computer system 600, any combination thereof, or other appropriate device. At step 512, the method 500 may include determining if the object 105 is still on the trajectory to collide with the interactive surface 110 despite the notifications. Step 512 may be performed by the location determination device 115, the interactive surface 110, the server 150, the computer system 600, any combination thereof, or other appropriate device. If the object 105 is no longer on course to collide with the interactive surface after the initial notifications, the method 500 may include reducing or removing the notifications from or around the interface surface 110 at step 514. However, if the object 105 is still on course for a collision with the interface surface 110, then the method 500 may include increasing the intensity or number of notifications, or both, so that the object 105 hopefully changes its trajectory at step 516. In one embodiment, steps 514 and 516 may be performed by the interactive surface 110, the server 150, the computer system 600, any combination thereof, or other appropriate device.

In one embodiment, the system 100 and methods described herein may include presenting the notifications only on a portion of the interactive surface 110. For instance, while notifications are presented on some portions, other portions of the interface surface 110 can remain in normal operational mode. In another embodiment, the systems and methods may include enabling a person to use the interactive surface 110 as a whiteboard. For example, if the system 100 causes the interactive surface 110 to become opaque as a notification to a person approaching the interactive surface 110, the opaque portion may be used as a whiteboard by the person. In an embodiment, the trajectory calculated by the system 100 may be a predicted path that the person or object 105 may be determined to be following.

In another embodiment, the system 100 and methods may include providing a specific sequence or pattern of notifications based on the situation that presents itself. For example, the system 100 may cause the interactive surface 110 to emit a specific low sound, multi-pulse sequence that can indicate when the interactive surface 110 can be utilized as a computer display, whiteboard, or for certain other purposes. In another embodiment, the system 100 and methods may include having the interactive surface 110 visually or orally identify its functions to users and any data to which it has access. In another embodiment, the system 100 and methods can utilize infrared technology, motion detectors, laser detectors, or any other type of detector to assist in determine a position, velocity, or other information associated with an object 105. In another embodiment, the method 500 may include determining the positions and velocities of multiple objects 105. Multiple trajectories may be determined either for a single object 104 or for multiple objects 105 and notifications may be generated so that they are tailored to each object 105 that is approaching the interactive interface. It is important to note that the methods described above may incorporate any of the functionality, devices, or features of the systems described above, or otherwise, and are not intended to be limited to the description or examples provided herein.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

Figure 6:
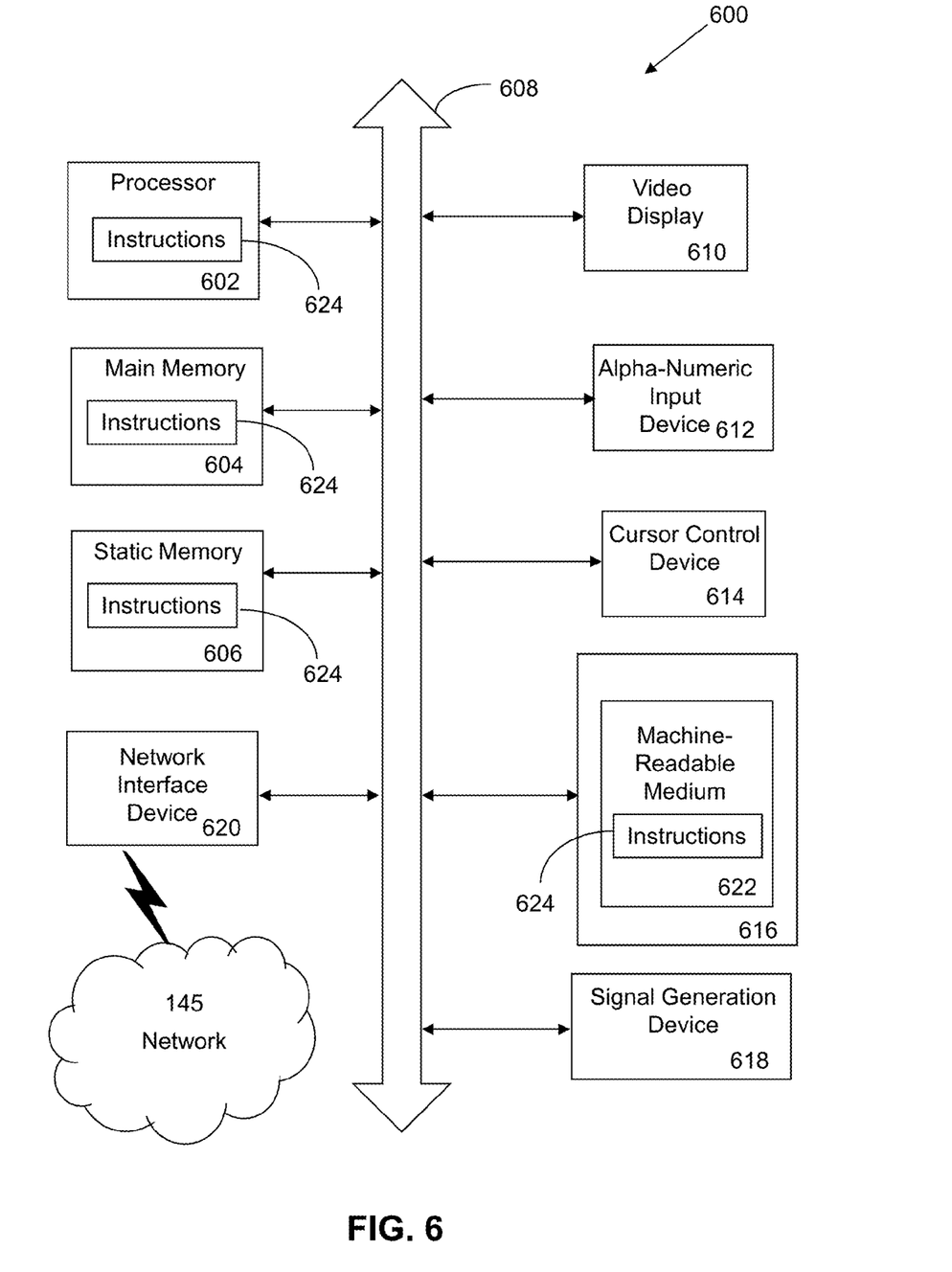
FIG. 6 is a diagrammatic representation of a machine in the form of a computer system within which a set of instructions, when executed, may cause the machine to perform any one or more of the methodologies discussed herein.

Referring now also to FIG. 6, at least a portion of the methodologies and techniques described with respect to the exemplary embodiments can incorporate a machine, such as, but not limited to, computer system 600, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, by capturing media content, or by assisting with any other operations conducted by or within the system 100.

In some embodiments, the machine operates as a standalone device. In some embodiments, the machine may be connected (e.g., using a network 145) to and assist with operations performed by other machines, such as, but not limited to, the interactive surface 110, the location determination device 115, the image capture device 120, the air movement sensor 125, the sound sensor 130, the vibration sensor 135, the ultrasound device 137, the mobile device 140, the server 150, and the database 155, or any combination thereof. The machine may be connected with any component in the system 100. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 604, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions 624 (e.g., software) embodying any one or more of the methodologies or functions described herein, including those methods illustrated above. The instructions 624 may also reside, completely or at least partially, within the main memory 604, the static memory 606, or within the processor 602, or a combination thereof, during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624 so that a device connected to the communications network 145 can send or receive voice, video or data, and to communicate over the network 145 using the instructions 624. The instructions 624 may further be transmitted or received over the network 145 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

We claim:

1. A system for providing awareness of a user electronic interactive glass surface, comprising:
    a memory for storing instructions; and
    a processor coupled to the user electronic interactive glass surface, the processor for executing the instructions to perform operations, the operations comprising:
        receiving output from sensors regarding an object that is within a range of the user electronic interactive glass surface, wherein the sensors output includes image data;
        detecting a position, a shape, a size, and a velocity of the object that is in the range of the user electronic interactive glass surface based at least in part on the sensors output including the image data;
        determining if the object has a trajectory that would cause the object to collide with the user electronic interactive glass surface, wherein the trajectory is determined based on the position, the shape, the size, and the velocity of the object; and
        generating a notification if the object is determined to have the trajectory that would cause the object to collide with the user electronic interactive glass surface based on the determined position, shape, size, and velocity of the object, wherein the notification comprises adjusting an opacity of the user electronic interactive glass surface based on the trajectory of the object.

2. The system of claim 1, wherein the operations further comprise removing the notification if the object is determined to no longer have the trajectory that would cause the object to collide with the user electronic interactive glass surface.

3. The system of claim 1, wherein the operations further comprise increasing an intensity of the notification as the object gets closer to the user electronic interactive glass surface.

4. The system of claim 1, wherein the operations further comprise decreasing an intensity of the notification as the object get farther away from the user electronic interactive glass surface.

5. The system of claim 1, wherein the operations further comprise detecting a change in air movement associated with the object and generating the notification if the change is higher than a threshold value.

6. The system of claim 1, wherein the operations further comprise detecting vibrations associated with the object, and generating the notification if the vibrations are greater than a threshold value.

7. The system of claim 1, wherein the operations further comprise detecting a sound associated with the object, and wherein the operations further comprise generating the notification if the sound is greater than a threshold value.

8. The system of claim 1, wherein the notification further comprises generating a sequence of notifications that indicate a function of the electronic interactive glass surface.

9. The system of claim 1, wherein the notification further comprises generating an auditory signal from the user electronic interactive glass surface.

10. The system of claim 1, wherein the notification further comprises generating a visual signal that is viewable from the user electronic interactive glass surface.

11. The system of claim 1, wherein the operations further comprise detecting the position and the velocity of the object by utilizing one of the group consisting of a global positioning system, a cellular network, and a wireless network.

12. The system of claim 1, wherein the operations further comprise detecting the position and the velocity of the object by utilizing a motion sensor.

13. A method for providing awareness of a user electronic interactive glass surface, comprising:
    receiving output from sensors regarding an object that is within a range of the user electronic interactive glass surface, wherein the sensors output includes image data;
    determining, by utilizing instructions from memory that are executed by a processor, a position, a shape, a size, and a velocity of the object that is in the range of the user electronic interactive glass surface based at least in part on the sensors output that includes the image data;
    determining if the object has a trajectory that would cause the object to collide with the user electronic interactive glass surface, wherein determining the trajectory is based on the position, the shape, the size, and the velocity of the object; and generating a notification if the object is determined to have the trajectory that would cause the object to collide with the user electronic interactive glass surface based on the determined position, shape, size, and velocity of the object, wherein the notification comprises adjusting an opacity of the user electronic interactive glass surface based on the trajectory of the object.

14. The method of claim 13, further comprising increasing an intensity of the notification as the object gets closer to the user electronic interactive glass surface.

15. The method of claim 13, further comprising emitting an ultrasonic sound in the range of the user electronic interactive glass surface and receiving an echo from the object based on the ultrasonic sound, and further comprising generating the notification based on the echo from the object.

16. The method of claim 13, further comprising removing the notification if the object is determined to no longer have the trajectory to collide with the user electronic interactive glass surface.

17. The method of claim 13, wherein the notification further comprises generating a haptic signal from the user electronic interactive glass surface.

18. The method of claim 13, further comprising generating a visual identification of a function of the user electronic interactive glass surface.

19. The method of claim 13, wherein the notification further comprises generating an auditory signal from the user electronic interactive glass surface.

20. A non-transitory computer-readable medium comprising instructions, which when executed by a processor, cause the processor to perform operations comprising:

receiving output from sensors regarding an object that is within a range of a user electronic interactive glass surface, wherein the sensors output includes image data;

determining a position, a shape, a size, and a velocity of the object that is in the range of the user electronic interactive glass surface based at least in part on the sensors output that includes the image data;

determining if the object has a trajectory that would cause the object to collide with the user electronic interactive glass surface, wherein the trajectory is determined based on the position, the shape, the size, and the velocity of the object; and generating a notification if the object is determined to have the trajectory that would cause the object to collide with the user electronic interactive glass surface based on the determined position, shape, size, and velocity of the object, wherein the notification comprises adjusting an opacity of the user electronic interactive glass surface based on the trajectory of the object.

* * * * *